United States Patent
Geissenhoener

(10) Patent No.: US 9,669,682 B2
(45) Date of Patent: Jun. 6, 2017

(54) METHOD FOR OPERATING A MOTOR VEHICLE WITH PRE-AIR CONDITIONING AND MOTOR VEHICLE

(71) Applicant: AUDI AG, Ingolstadt (DE)

(72) Inventor: Martin Geissenhoener, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/768,579

(22) PCT Filed: Feb. 20, 2014

(86) PCT No.: PCT/EP2014/000449
§ 371 (c)(1),
(2) Date: Aug. 18, 2015

(87) PCT Pub. No.: WO2014/127915
PCT Pub. Date: Aug. 28, 2014

(65) Prior Publication Data
US 2016/0001631 A1    Jan. 7, 2016

(30) Foreign Application Priority Data

Feb. 22, 2013   (DE) .................. 10 2013 003 062

(51) Int. Cl.
*B60H 1/00*       (2006.01)
*F02N 11/08*      (2006.01)

(52) U.S. Cl.
CPC ..... *B60H 1/00778* (2013.01); *F02N 11/0807* (2013.01)

(58) Field of Classification Search
CPC .................. B60H 1/007778; F02N 11/0807
USPC ......................................................... 701/36, 2
See application file for complete search history.

(56) References Cited

U.S. PATENT DOCUMENTS

| 6,745,582 B1 | 6/2004 | Urbank et al. |
| 8,479,706 B2 * | 7/2013 | Speers ................ F02N 11/0803 123/179.2 |
| 8,972,152 B2 * | 3/2015 | Boesch ............... F02N 11/0837 123/179.2 |
| 2006/0080007 A1 | 4/2006 | Gerard et al. |

(Continued)

FOREIGN PATENT DOCUMENTS

| CN | 101492025 | 7/2009 |
| DE | 10007195 | 9/2001 |

(Continued)

OTHER PUBLICATIONS

Office Action mailed Mar. 29, 2016 in Chinese Patent Application No. 201480009884.5.

(Continued)

*Primary Examiner* — Mussa A Shaawat
*Assistant Examiner* — Nadeem Odeh
(74) *Attorney, Agent, or Firm* — Staas & Halsey LLP

(57) ABSTRACT

Air-conditioning of an engine-driven motor vehicle is started by way of an activation signal when the motor vehicle is deactivated. With the activation signal, the engine and an air-conditioning device are activated. The engine is switched on for a maximum engine operating duration which is selected in accordance with a temperature of the engine and/or an ambient temperature of the motor vehicle and/or a temperature of an exhaust gas system of the motor vehicle, in particular a catalytic converter.

10 Claims, 1 Drawing Sheet

(56) References Cited

U.S. PATENT DOCUMENTS

| | | |
|---|---|---|
| 2007/0119959 A1 | 5/2007 | Wieszt |
| 2008/0117079 A1* | 5/2008 | Hassan ................ B60R 25/045 340/901 |
| 2009/0000324 A1 | 1/2009 | Cheng |
| 2010/0106363 A1 | 4/2010 | Mandujano |
| 2010/0186711 A1 | 7/2010 | Speers et al. |

FOREIGN PATENT DOCUMENTS

| | | |
|---|---|---|
| DE | 10316106 | 10/2004 |
| DE | 10326596 | 11/2004 |
| DE | 10320920 | 12/2004 |
| DE | 102005004950 | 8/2006 |
| DE | 102009054814 | 6/2011 |
| DE | 10 2013 003 062 | 2/2013 |
| EP | 2080651 | 7/2009 |
| EP | 2014/000449 | 2/2014 |

OTHER PUBLICATIONS

WIPO English language translation Report on Patentability for PCT/EP2014/000449, downloaded from WIPO website on Oct. 15, 2015, 6 pages.

German Office Action for German Priority Patent Application No. 10 2013 003 062.5, issued Feb. 12, 2014, 4 pages.

English Language of the International Search Report for PCT/EP2014/000449, mailed Apr. 23, 2014, 2 pages.

Chinese Office Action issued on Oct. 18, 2016 in corresponding Chinese Patent Application No. 201480009884.5.

\* cited by examiner

METHOD FOR OPERATING A MOTOR VEHICLE WITH PRE-AIR CONDITIONING AND MOTOR VEHICLE

CROSS REFERENCE TO RELATED APPLICATIONS

This application is based on and hereby claims priority to International Application No. PCT/EP2014/000449 filed on Feb. 20, 2014 and German Application No. 10 2013 003 062.5 filed on Feb. 22, 2013, the contents of which are hereby incorporated by reference.

BACKGROUND

The invention relates to a method for operating a motor vehicle, air-conditioning of the motor vehicle, which is driven by an engine, being started by at least one air-conditioning device by an activation signal when the motor vehicle is deactivated.

Stationary heaters and stationary air-conditioning devices are already largely known in the related art. They are used to already change a motor vehicle in the direction of an air-conditioning state desired by the driver when the driver has not yet activated the motor vehicle. In an improvement of this functionality, it has been proposed to also already render air-conditioning devices, which are driven by an engine or use the engine, usable before the driver actually enters the motor vehicle. For this purpose, it is possible to use, for example, a radio remote control of the motor vehicle which provides the motor vehicle with a corresponding activation signal. The engine in the motor vehicle is activated then or at a time provided with the activation signal. The same applies to the air-conditioning device which begins to cool or heat the motor vehicle as required. When the driver then reaches the motor vehicle, he can ideally find the desired climate in the motor vehicle, but at least already a pre-air-conditioned motor vehicle. It goes without saying that other signals can also be used as the activation signal, for example in the manner of a scheduler which is coupled to a corresponding system belonging to the driver, in particular, the air-conditioning being effected in response to specific appointments.

However, in the case of such operating methods when (pre)air-conditioning a motor vehicle, in particular after a so-called "remote start", the problem arises of the motor vehicle possibly being situated in a closed space, for example a garage. If the engine is now activated, exhaust gases occur which may be hazardous in excessively high concentrations. Therefore, the known methods provide for the air-conditioning period and therefore the period in which the engine is operated to be limited to a predetermined, fixed, maximum engine operating time.

However, the air-conditioning performance is extremely restricted as a result of this time limitation. In the event of extreme heat or cold, the result may be that the target temperature of the air-conditioning cannot be reached.

SUMMARY

Therefore, one possible object relates to specifying a possibility for air-conditioning a motor vehicle when using an engine, which possibility allows the air-conditioning performance to be optimized with a harmless exhaust gas emission.

The inventor proposes a method for operating a motor vehicle, air-conditioning of the motor vehicle, which is driven by an engine, being started by at least one air-conditioning device by an activation signal when the motor vehicle is deactivated, the engine being operated for a maximum engine operating time. The engine operating time is selected on the basis of a temperature of the engine and/or an ambient temperature of the motor vehicle and/or a temperature of an exhaust gas system of the motor vehicle, in particular a catalytic converter.

It is therefore proposed that the engine operating time is not fixedly stipulated but rather can be selected in a targeted manner on the basis of the outside temperature, the engine temperature and/or the exhaust gas system temperature in such a manner that there is nevertheless no risk of high pollutant concentrations. This is because it was determined in exhaust gas measurements that more exhaust gas is emitted when the outside temperature is low, which also applies when the engine temperature is low. A corresponding relationship was also determined for the exhaust gas system. In contrast, it was measured that considerably less harmful exhaust gases are emitted in the case of a warm engine, warm outside temperatures and a warm exhaust gas system. This now makes it possible to choose longer maximum engine operating times for certain situations by at least partially evaluating said temperatures. This increases the comfort with respect to the pre-air conditioning since target temperatures can be reached sooner, but simultaneously also reduces the risk of high pollutant concentrations when the motor vehicle is in a closed space. Therefore, the extremely limited engine running time can be extended by evaluating the temperatures.

In this case, provision may expediently be made for the engine operating time to increase with increasing temperature of the engine and/or increasing ambient temperature and/or increasing temperature of the exhaust gas system. In this case, it should be noted that even longer engine operating times can also be achieved in situations of low outside temperatures if the engine is still warm, for example from previous operation. A corresponding situation also applies to an exhaust gas system.

Provision may expediently be made for the engine operating time to be selected from at least one characteristic curve and/or a family of characteristics. The control unit which controls the operation of the engine and the air-conditioning devices and also determines the maximum engine operating time may therefore have a storage device containing suitable characteristic curves and/or families of characteristics. An engine operating time is then assigned to given measured temperatures there. It is noted, for the rest, that temperature sensors are often provided anyway in known motor vehicles, at least for the engine and the outside temperature.

The engine operating times can generally be selected with the proposals in such a manner that a maximum permissible exhaust gas emission is not exceeded on the basis of the at least one temperature. In particular, different limit values can be defined for harmful exhaust gases or exhaust gas substances, for example. Measurements reveal which exhaust gas quantities are emitted at which temperatures, with the result that suitable safe engine operating times can be determined therefrom and can then be stored, for example, in a characteristic curve and/or a family of characteristics, as described.

In addition to the proposed method, the inventor proposes a motor vehicle, comprising an engine, an air-conditioning device which can be driven by the engine and a control unit, which is designed to carry out the proposed method. All of the statements made with respect to the method can be analogously applied to the motor vehicle which can therefore be used to achieve the same advantages.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
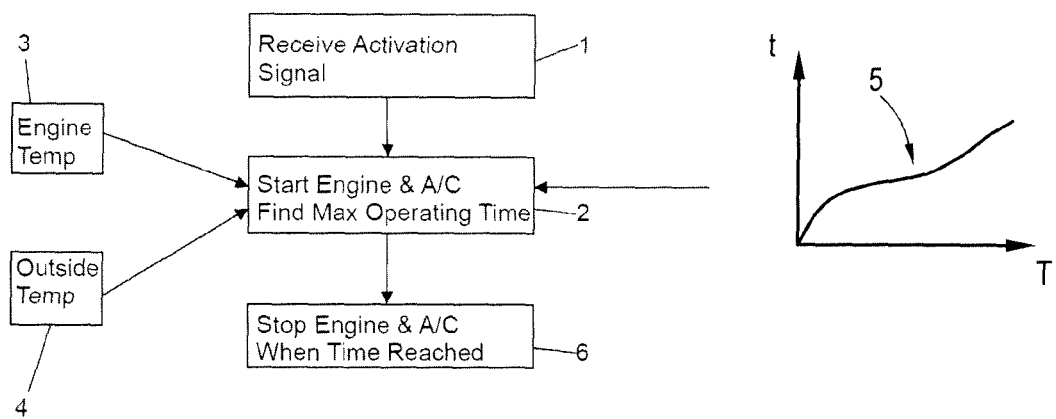
FIG. 1 shows a flowchart of the proposed method.

Reference will now be made in detail to the preferred embodiments of the present invention, examples of which are illustrated in the accompanying drawings, wherein like reference numerals refer to like elements throughout.

FIG. 1 shows a flowchart of an exemplary embodiment of the proposed method for pre-air conditioning a motor vehicle. In this case, an activation signal is received in a box 1, from a radio remote control in the present exemplary embodiment. A target temperature in the motor vehicle can be assigned to the activation signal, but it is also possible to determine this target temperature from an adjustment which has already been previously made in the motor vehicle.

In a box 2, the engine and at least one air-conditioning device, which is intended to be used to achieve the target temperature, for example components of a conventional air-conditioning system, are then started and a maximum engine operating time is determined for the situation in which the motor vehicle is in a closed space. In this exemplary embodiment, the control unit which carries out the method receives a temperature 3 of the engine of the motor vehicle and an outside temperature 4, which represents the temperature in the area surrounding the motor vehicle, as input values for this determination. A storage device of the control unit now contains characteristic curves 5 which can be used to derive, on the basis of the temperatures 3, 4, a maximum engine operating time which ensures that a maximum permissible exhaust gas emission is not exceeded. Higher maximum engine operating times clearly result, the higher the temperature, where t represents the engine operating time and T represents the temperature.

In a box 6, the engine, and therefore also the air-conditioning device, is then switched off again when the maximum engine operating time has been reached.

Figure 2:
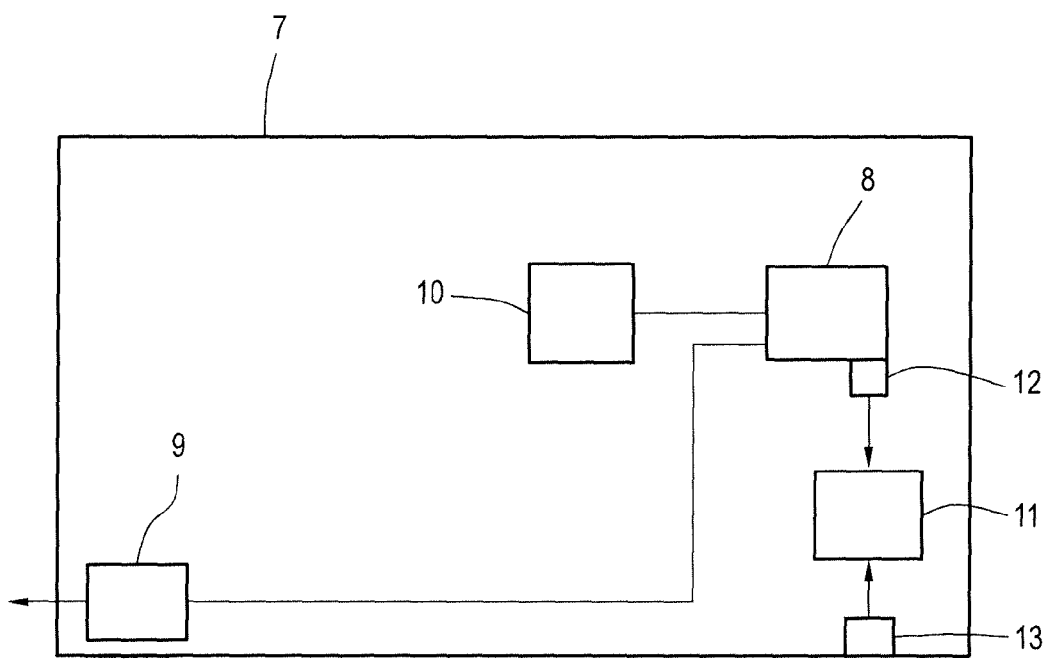
FIG. 2 shows a basic outline of a proposed motor vehicle.

FIG. 2 shows a basic outline of a proposed motor vehicle 7. The latter has an engine 8, here an internal combustion engine, the exhaust gases of which leave the motor vehicle 7 via an exhaust gas system 9. The motor vehicle 7 also has at least one air-conditioning device 10, for example an air-conditioning system.

A control unit 11 which is designed to carry out the proposed method controls the pre-air conditioning of the motor vehicle 7 in response to an activation signal. The control unit 11 can therefore activate the engine 8 and the air-conditioning device 10 and in the process can operate the engine 8 for a maximum engine operating time. The maximum engine operating time is selected on the basis of a temperature 3 of the engine, which is measured by a temperature sensor 12, and an outside temperature measured by a temperature sensor 13.

A temperature sensor can also be provided in the exhaust gas system 9, which temperature sensor provides an input data item for determining the maximum engine operating time.

It is also noted at this juncture that shorter engine operating times are also naturally conceivable as the maximum engine operating time; for example, the engine can be switched off again when the target temperature is already reached before expiry of the maximum engine operating time.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for operating a motor vehicle, comprising:
   driving an air-conditioning device of the motor vehicle by an engine of the motor vehicle;
   receiving an activation signal when the motor vehicle is deactivated;
   after receiving the activation signal, activating the engine and starting the air-conditioning device;
   determining a maximum engine operating time that produces a maximum permissible exhaust gas emission, the maximum engine operating time being determined based on at least one characteristic temperature, the at least one characteristic temperature being selected from the group consisting of a temperature of the engine, an outside temperature in an area surrounding the motor vehicle and a temperature of a catalytic converter of an exhaust gas system of the motor vehicle, the maximum engine operating time being determined by relating the at least one characteristic temperature to an emission amount of harmful exhaust gas; and
   operating the engine for pre-air conditioning for no more than the maximum engine operating time, wherein
   the maximum engine operating time increases as the at least one characteristic temperature increases.

2. The method as claimed in claim 1, wherein the maximum engine operating time is determined from at least one of a characteristic curve and characteristics relating the emission amount of harmful exhaust gas with the characteristic temperature.

3. The method as claimed in claim 1, wherein the activation signal is received from a radio remote control.

4. The method as claimed in claim 1, wherein the engine is operated until:
   the maximum engine operating time expires, or
   a target temperature in a passenger compartment of the motor vehicle has been reached, when the target temperature in the passenger compartment of the motor vehicle is reached before expiration of the maximum engine operating time.

5. The method as claimed in claim 1, wherein the temperature of the engine is used as the at least one characteristic temperature.

6. The method as claimed in claim 1, wherein the outside temperature in the area surrounding the motor vehicle is used as the at least one characteristic temperature.

7. The method as claimed in claim 1, wherein the temperature of the catalytic converter is used as the at least one characteristic temperature.

8. The method as claimed in claim 1, wherein the temperature of the engine and the outside temperature in the area surrounding the motor vehicle are used as the at least one characteristic temperature.

9. The method as claimed in claim 1, wherein the maximum engine operating time is determined for a situation in which the motor vehicle is in a closed space.

10. A motor vehicle, comprising:
an air-conditioning device;
an engine to drive the air-conditioning device; and
a control unit to:
   receive an activation signal when the motor vehicle is deactivated;
   activate the engine and start the air-conditioning device after the activation signal is received;
   determine a maximum engine operating time that produces a maximum permissible exhaust gas emission, the maximum engine operating time being determined based on at least one characteristic temperature, the at least one characteristic temperature being selected from the group consisting of a temperature of the engine, an outside temperature in an area surrounding the motor vehicle and a temperature of a catalytic converter of an exhaust gas system of the motor vehicle, the maximum engine operating time being determined by relating the at least one characteristic temperature to an emission amount of harmful exhaust gas; and
   operate the engine for pre-air conditioning for no more than the maximum engine operating time, wherein the maximum engine operating time increases as the at least one characteristic temperature increases.

* * * * *